United States Patent [19]

Uehara

[11] Patent Number: 5,530,629
[45] Date of Patent: Jun. 25, 1996

[54] OPTICAL AXIS ADJUSTING DEVICE FOR AUTOMOTIVE HEADLIGHTS

[75] Inventor: Kunio Uehara, Hiratsuka, Japan

[73] Assignee: Ichikoh Industries, Ltd., Tokyo, Japan

[21] Appl. No.: 500,357

[22] Filed: Jul. 10, 1995

[30] Foreign Application Priority Data

Jul. 11, 1994 [JP] Japan .................................. 6-158484

[51] Int. Cl.$^6$ ...................................................... B60Q 1/06
[52] U.S. Cl. .......................... 362/66; 362/273; 362/289
[58] Field of Search .............................. 362/66, 273, 284, 362/289, 319, 324, 428

[56] References Cited

U.S. PATENT DOCUMENTS

| | | | |
|---|---|---|---|
| 5,083,244 | 1/1992 | Shirai et al. | 362/61 |
| 5,428,519 | 6/1995 | Salmon et al. | 362/66 X |

*Primary Examiner*—Stephen F. Husar
*Attorney, Agent, or Firm*—Foley & Lardner

[57] ABSTRACT

An optical axis adjusting device for automotive headlights is disclosed which consists of a pair of optical axis adjusters provided between the lamp unit and car body and each composed of an adjusting screw and screw mounting to adjust the optical axis of the lamp unit with the lamp unit tilted horizontally or vertically with respect to the car body by turning the adjusting screw. Each of the screw mountings is protruded at one end thereof to the back of the car body while the other end thereof is protruded to the front of the lamp unit. The adjusting screw is protruded at one end thereof to inside the car body and at the other end thereof to the front of the headlight, and has a first head formed at the one end thereof and a second head provided on the other end thereof. By turning an adjusting tool fitted on either the first or second screw head, the optical axis of the headlight can be adjusted at either of the front and back of the headlight. The second screw head has a stopper which is to abut a first abutment formed on the screw unit and prevent the adjusting screw from coming off from the screw mounting when the adjusting screw is excessively turned at the first head thereof in a direction to move the screw mounting toward the front of the headlight. The lamp unit or screw mounting has formed thereon a second abutment which the adjusting tool abuts and works to disengage the adjusting tool from on the second screw head when the screw mounting is moved to a predetermined position during adjustment of the optical axis at the second screw head.

3 Claims, 6 Drawing Sheets

# OPTICAL AXIS ADJUSTING DEVICE FOR AUTOMOTIVE HEADLIGHTS

BACKGROUND OF THE INVENTION

1. Field of the Invention

The present invention relates to an optical axis adjusting device for automotive lamps such as a headlight, fog lamp or the like, and more particularly to an optical axis adjusting device provided in an automotive headlight having a movable lamp unit, to adjust the headlight optical axis with the lamp unit tilted vertically and horizontally with respect to a car body by turning an optical-axis adjusting screw.

2. Related Art Statement

One of the prior-art optical axis adjusting devices for automotive headlights is known from the disclosure in the U.S. Pat. No. 5,083,244, for example. It will be described herebelow with reference to FIG. 1. As shown, the automotive headlight includes a lamp unit 100 comprising a lamp housing 101 and lens 102 which define together a bulb space (not shown) in which a lamp bulb (not shown) is provided. When turned on, the lamp bulb emits a light beam which is projected forward in a predetermined luminous distribution pattern through the lens 102. The lamp unit 100 is mounted to a car body 103 by means of a pivot mechanism 104 tiltably in the horizontal and vertical directions. The optical axis adjusting device consists of a pair of optical axis adjusters each composed of an adjusting screw 106, screw mounting (nut) 107 and others provided between the lamp unit 100 and car body 103. One of such optical axis adjusters in pair is intended for a horizontal optical axis adjustment and the other (not illustrated) is for a vertical adjustment.

It should be noted that in the detailed-description part of this Specification and Claims, a term "front of the headlight" refers to the outside of the car body 103 from which a light beam is projected forward from the headlight while a term "back of the headlight" refers to the inner side of the car body 103 opposite to the "front of the headlight".

The adjusting screw 106 is installed as penetrated through the car body 103 and retained with a push nut or wave washer 108 which allows the adjusting screw 106 to be turned but not to be moved axially thereof. The lamp unit 100 is provided with a fixture 109 in which a screw mounting 107 is fitted non-rotatably. The adjusting screw 106 is screwed in the screw mounting 107.

The adjusting screw 106 is projected at one end thereof to the back of the headlight from the car body 103. It has a screw head 110 formed at the one end thereof.

Now, the operation for optical axis adjustment will be explained herebelow. First at the back of the headlight, an adjusting tool (not shown) is engaged into a socket in the screw head 110 of the adjusting screw 106. The screw head 110 is formed like a socket head of a bolt. As the adjusting tool is turned, the screw mounting 107 is moved as screwed along the axis of the adjusting screw 106 thus turned. Correspondingly, the lamp unit 100 is tilted horizontally about an axis connecting the pivot mechanism 104 and the vertical optical-axis adjuster (not shown).

FIG. 1 illustrates only the horizontal optical axis adjuster but not the vertical one. The vertical optical axis adjuster is generally identical in construction and action to the horizontal one.

With the prior-art optical axis adjusting device, the optical axis can only be adjusted at the back of the headlight.

Also, if the adjusting screw 106 is turned excessively in the direction in which the screw mounting 107 is moved toward the front of the headlight, the adjusting screw 106 may possibly come off the screw mounting 107.

SUMMARY OF THE PRESENT INVENTION

The present invention has an object to provide a novel and improved optical axis adjusting device for automotive headlights, by which the optical axis of the headlight can be adjusted from either of the front and back of the headlight.

The present invention has another object to provide an optical axis adjusting device for automotive headlights, in which it is possible during adjustment of the optical axis at the back of the headlight to prevent an adjusting screw from coming off from a screw mounting even if the adjusting screw is turned excessively in a direction to move the screw mounting toward the front of the headlight.

The present invention has a still another object to provide an optical axis adjusting device for automotive headlights, in which an adjusting tool used to turn the adjusting screw is disengaged from on the adjusting screw when the screw mounting is moved to a predetermined position toward the front of the headlight during adjustment of the optical axis at the front of the headlight.

In the optical axis adjusting device according to the present invention, one end of the adjusting screw is protruded to the back of the headlight and has a first head formed thereon, while the other end is protruded to the front of the screw mounting and has a second head provided thereon. To adjust the optical axis of the automotive headlight, an adjusting tool having a socket head is to be used. It is to be fitted at the socket head thereof onto the first or second head of the adjusting screw and turned clockwise or counterclockwise as necessary. Namely, the optical axis can be adjusted at either of the front and back of the headlight.

The second screw head includes a stopper which is to abut a first abutment formed on the screw mounting and prevent the adjusting screw from coming off from the screw mounting when the adjusting screw is excessively turned at the first head thereof in a direction to move the screw mounting toward the front of the headlight. Thus, even if the adjusting screw is excessively turned at the first head thereof at the back of the headlight in a direction to move the screw mounting toward the front of the headlight, the stopper abuts the first abutment to prevent the adjusting screw from coming off from the screw mounting.

The lamp unit or screw mounting has provided thereon a second abutment which the adjusting tool used to turn the adjusting screw abuts and works to disengage the tool from on the second screw head when the screw mounting is moved to a predetermined position toward the front of the headlight during adjustment of the optical axis at the front of the headlight, namely, to a position just before the stopper abuts the first abutment. Thus, when the screw mounting is moved to the predetermined position toward the front of the headlight during adjusting of the optical axis at the second screw head, the tool abuts the second abutment and is disengaged from the adjusting screw.

DETAILED DESCRIPTION OF THE PREFERRED EMBODIMENTS

Figure 1:
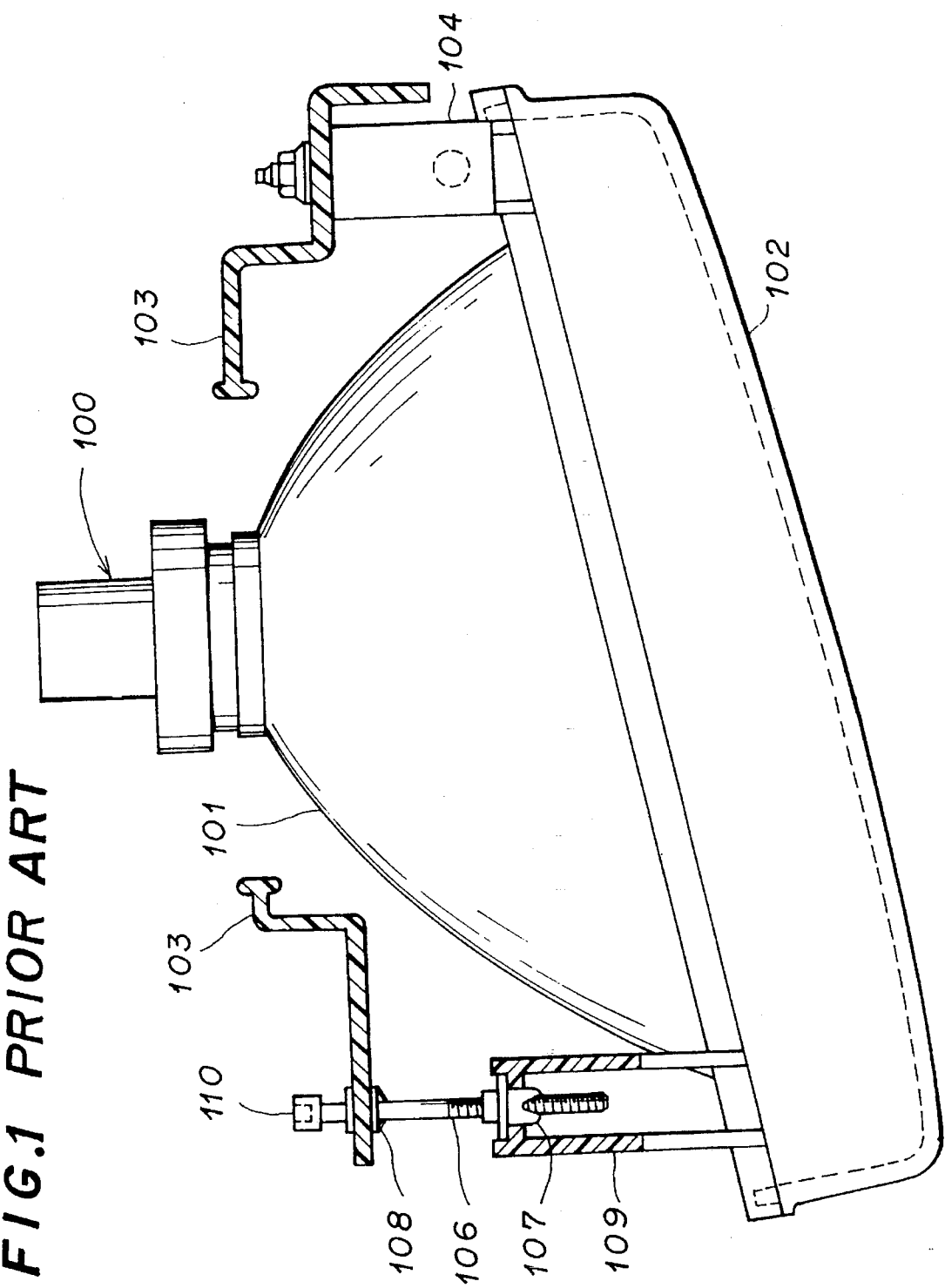
FIG. 1 is a plan view of an automotive headlight provided with a conventional optical axis adjusting device.

Referring now to FIGS. 2 to 5, the embodiment of the optical axis adjusting device for automotive headlights according to the present invention will be discussed below. The automotive headlight comprises a lamp unit 1. The lamp unit 1 comprises a lamp housing 10 and lens 11 which define together a lamp bulb space 12 in which a lamp bulb 13 is provided. When turned on, the lamp bulb 13 emits a light beam which is projected forward in a predetermined luminous distribution pattern through the lens 11.

The lamp unit 1 is installed to a car body 2 by a pivot mechanism 20 tiltably in horizontal and vertical directions.

There are provided between the lamp unit 1 and car body 2 horizontal and vertical optical axis adjusters, each composed of an adjusting screw 30 and screw mounting 32 according to the present invention.

Of the horizontal and vertical optical axis adjusters, the horizontal one will be described herebelow.

The car body 2 has formed thereon a fixture 21 having formed therein a through-hole 22 through which the adjusting screw 30 is provided. The adjusting screw 30 is penetrated through the through-hole 22 and retained there with a push nut or wave washer 31 which permits the adjusting screw 30 to be rotatable but not to be moved axially therewith.

The lamp housing 10 has a fixing boss 15 formed integrally thereof. The fixing boss 15 has formed in the back thereof a spherical concavity 16 in which the screw mounting 32 is fitted as retained with a plate 33 and non-rotatably about the axis of the adjusting screw 30. The screw mounting 32 holds the adjusting screw 30 as screwed through it. The plate 33 is fixed, with screws 34, to the fixing boss 15 of the lamp housing 1.

The adjusting screw 30 is protruded at one end thereof to the back of the headlight from the car body 2 and at the other end thereof to the front of the headlight from the screw mounting 32. The adjusting screw 30 has a first head 35 formed at the one end thereof and a second head 36 provided on the other end thereof. As the adjusting tool, a so-called socket wrench 5 is to be fitted at a socket head 51 thereof onto either the screw head 35 or 36 to turn the adjusting screw 30.

Each of the first and second screw heads 35 and 36 consists of two portions: Hexagonal portion and circular flange portion. The hexagonal and circular shapes are those when the adjusting screw 30 is viewed from the front thereof. It should be noted that the shape of the head may be any one other than "hexagonal" unless it is "circular".

Figure 2:
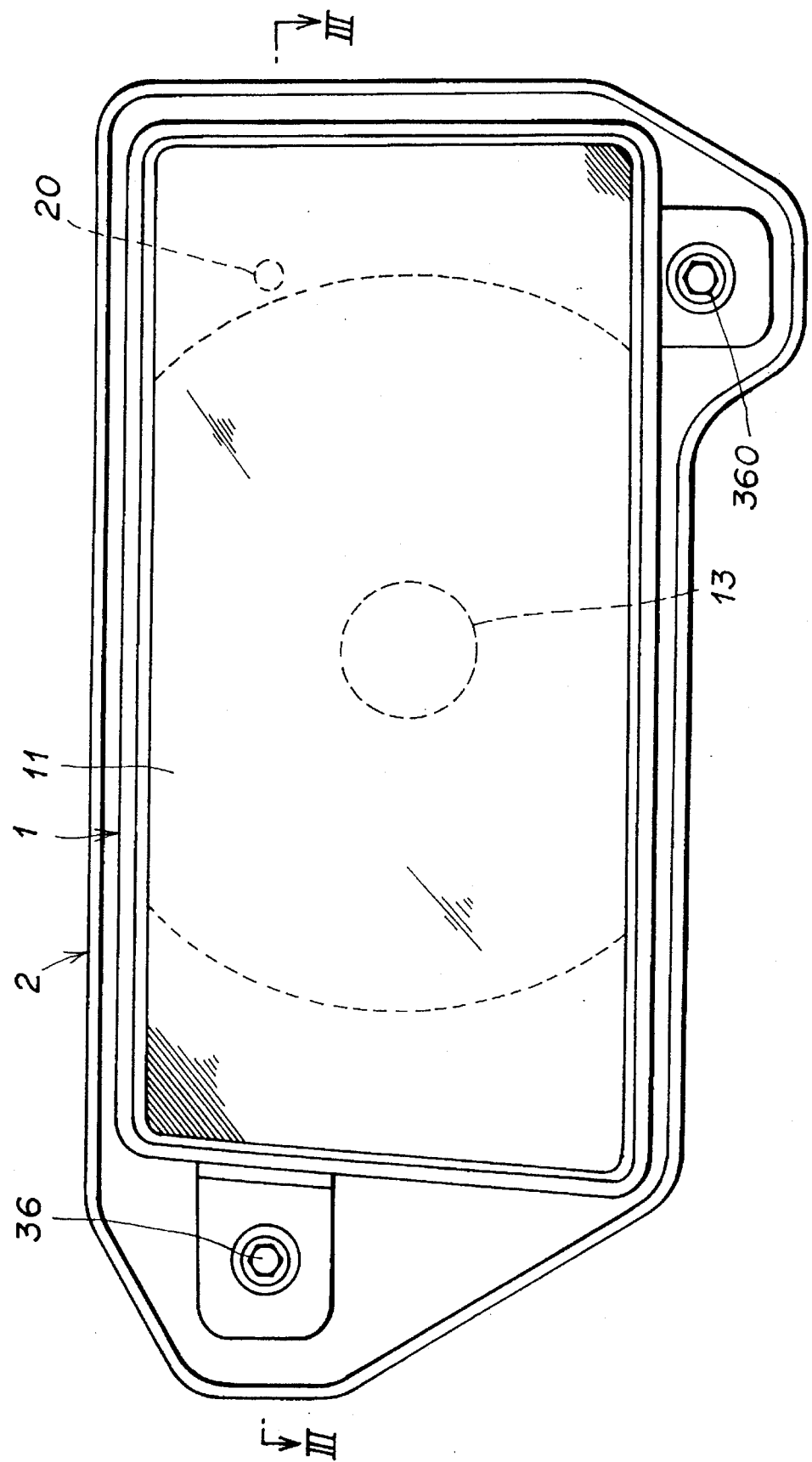
FIG. 2 is a front view of an automotive headlight provided with an embodiment of the optical axis adjusting device according to the present invention.

In FIG. 2, the reference numeral 360 indicates a second head provided at the front end (at the front of the headlight) of an adjusting screw (not shown) of a vertical optical axis adjuster.

The circular flange portion 361 formed on the second screw head 36 works as a stopper. This stopper 361 is to abut a first abutment 171 formed on the lamp unit 1 and prevent the adjusting screw 30 from coming off from the screw mounting 32 when the adjusting screw 30 is turned excessively at the first head 35 thereof at the back of the headlight in a direction to move the screw mounting 32 toward the front of the headlight.

The lamp unit 1 has also a second abutment 172 formed thereon. The second abutment 172 is to abut the socket head 51 of the adjusting tool 5 and disengage the second screw head 36 from the socket head 51 of the adjusting tool 5 before the stopper 361 abuts the first abutment 171 when the adjusting screw 30 is turned excessively at the second head 36 thereof at the back of the headlight in the direction in which the screwing mounting is moved toward the front of the headlight.

The above-mentioned second screw head 36 and stopper 361 are integrally formed from a synthetic resin or metal. To install them onto the adjusting screw 30, the adjusting screw 30 is screwed through the screw mounting 32, and then the second screw head 36 and stopper 361 are fixed together to the second end of the adjusting screw 30 with a spline (which will be advantageous in case the second screw head 36 and stopper 361 are made of a synthetic resin) or any other appropriate manner.

The lamp unit 1 has a second abutment 172 formed thereon. This second abutment 172 is so formed that when the screw mounting 32 is moved to a predetermined position toward the front of the headlight during adjustment of the optical axis at the front of the headlight, that is, to a position just before the stopper 361 abuts the first abutment 171, the socket head 51 of the tool 5 abuts the second abutment 172 and is disengaged from on the second screw head 36.

The first abutment 171 is formed on the bottom of the concavity 17 at the front side of the fixing boss 15 of the lamp housing 10 while the second abutment 172 is formed on the edge of the concavity 17. The front opening of the concavity 17 is so large as to receive the stopper 361 and second screw head 36 and that the socket head 51 of the adjusting tool 5 abuts the second abutment 172. The depth of the concavity 17 to the bottom of the first abutment 171 is larger than the height of the stopper 361 and second screw head 36.

Figure 3:
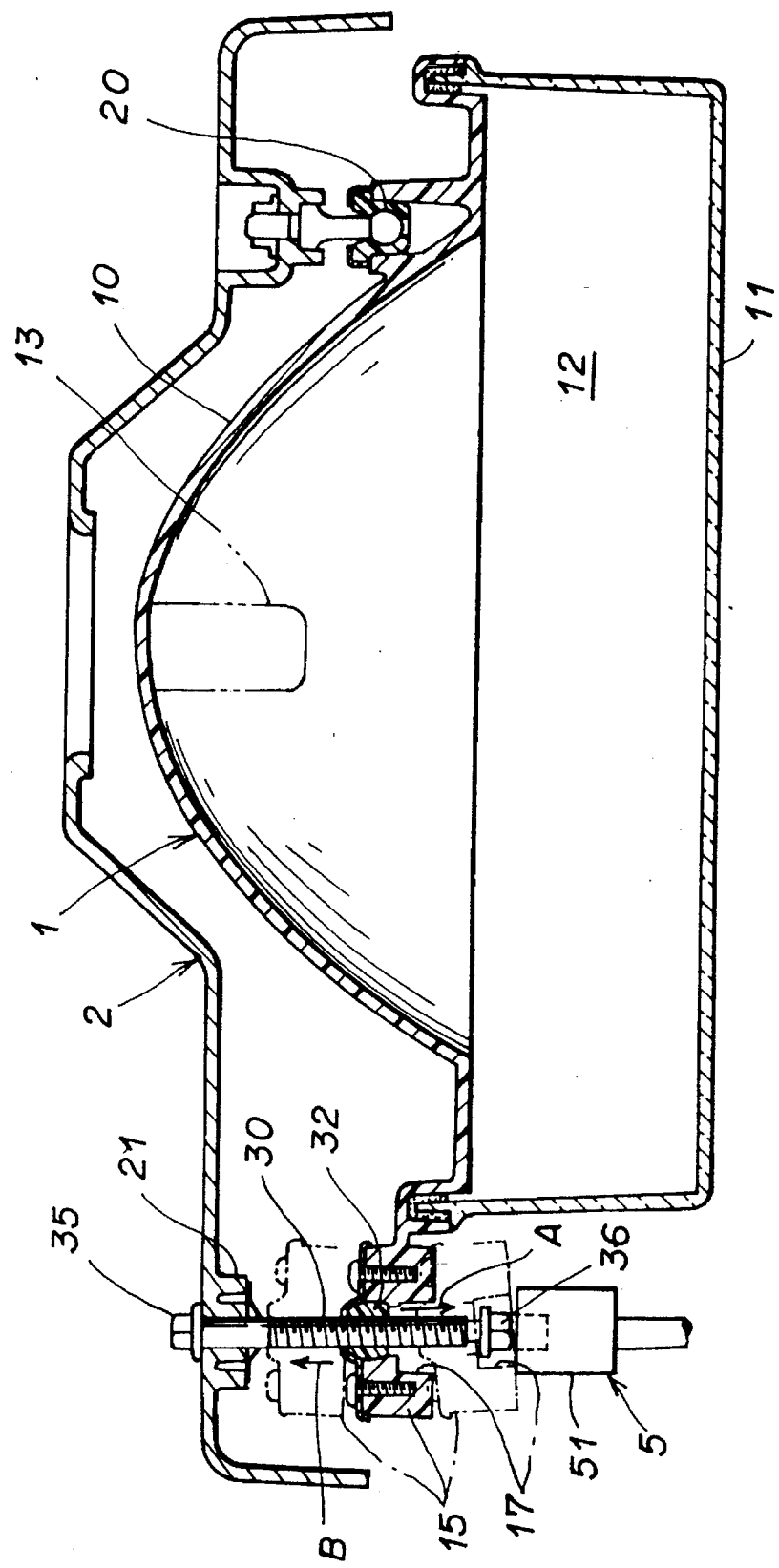
FIG. 3 is an axial sectional view taken along the line III—III in FIG. 2.
Figure 4:
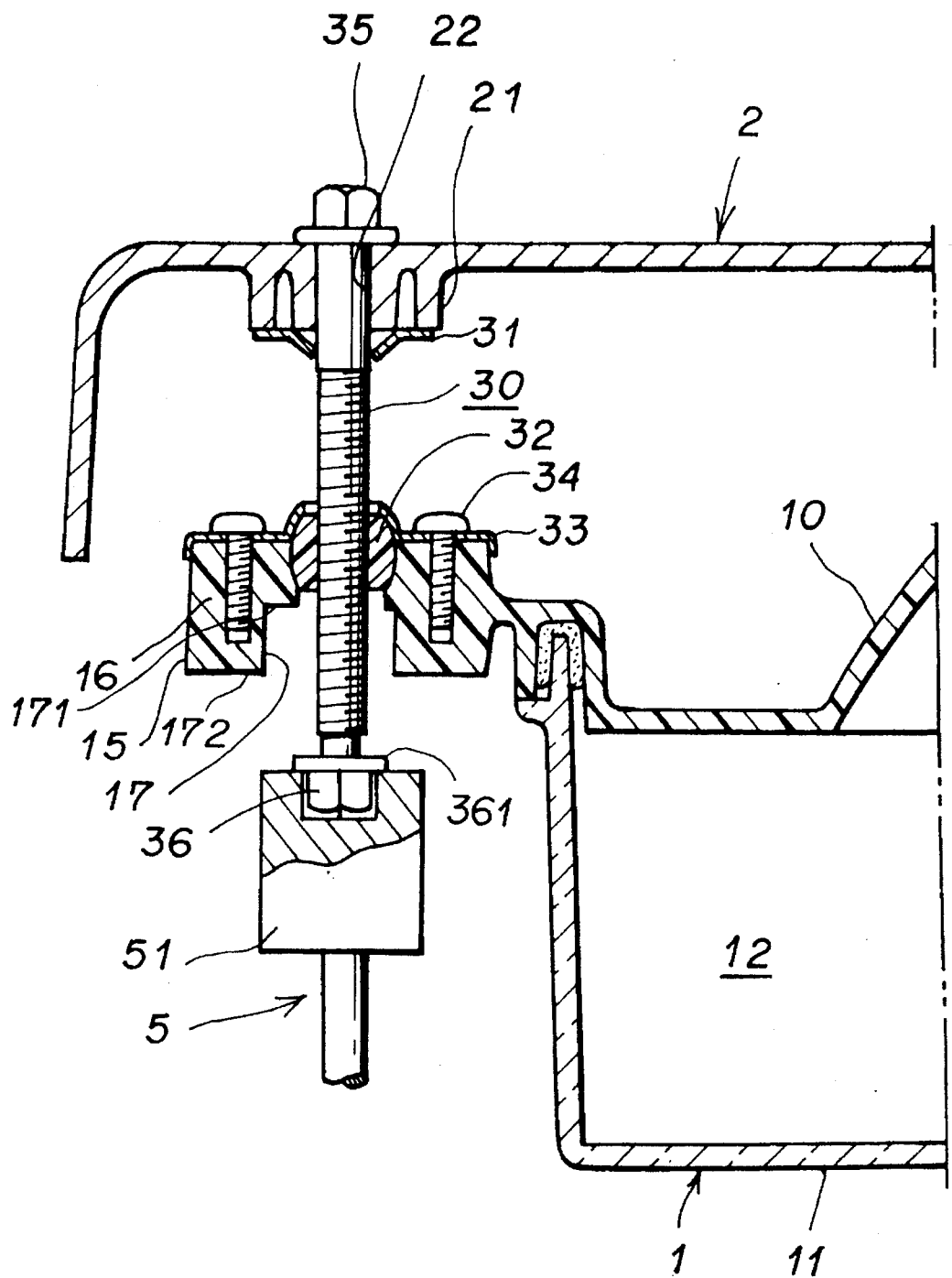
FIG. 4 is a sectional view, partially enlarged in scale, showing an optical axis adjustment at the front of the automotive headlight by turning the adjusting screw with an adjusting tool.
Figure 5:
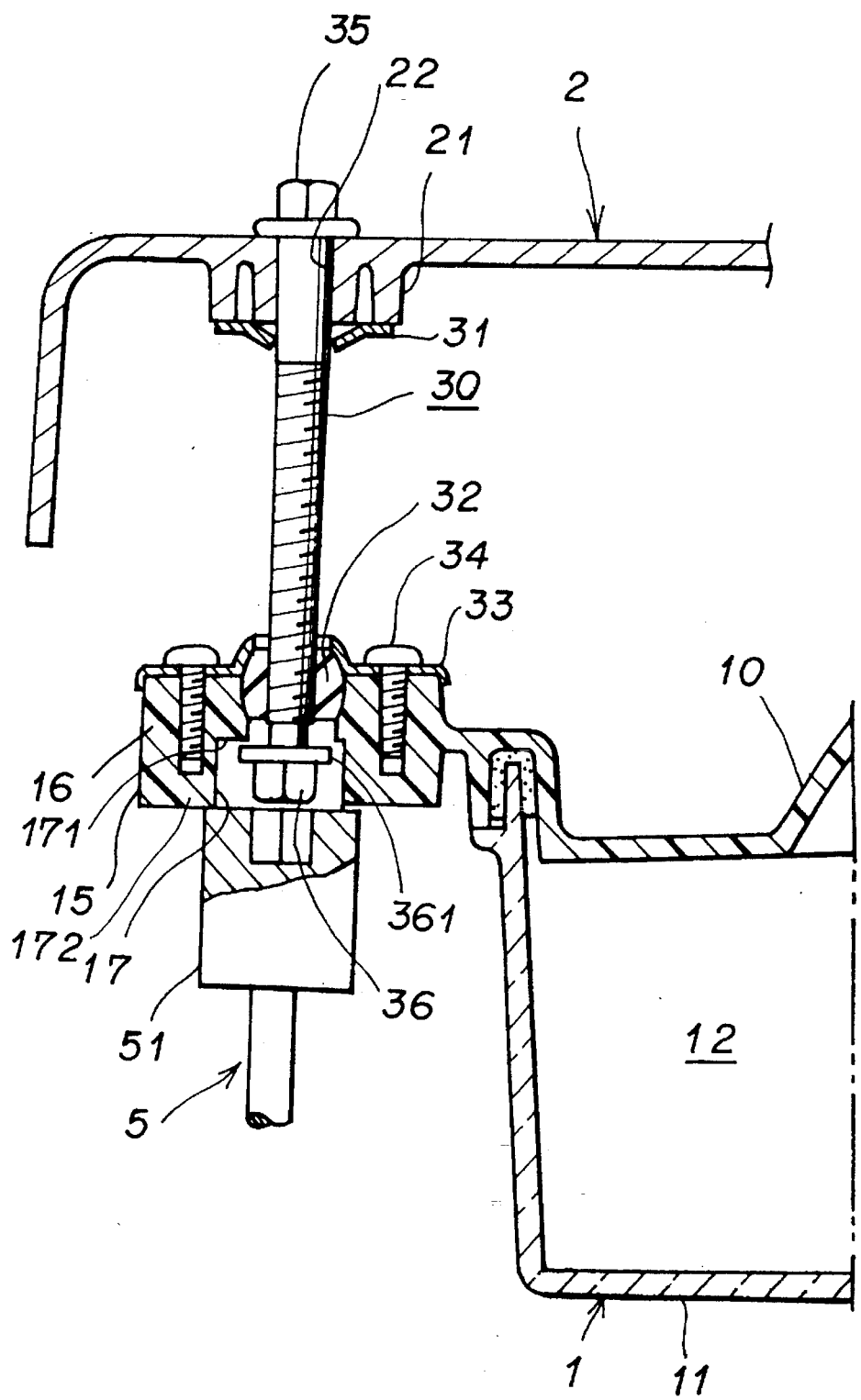
FIG. 5 is a sectional view, partially enlarged in scale, showing a disengagement of the tool from on the adjusting screw, taking place when the adjusting tool is excessively turned in the unscrewing direction of the adjusting screw.

Next, the adjustment of the optical axis will be explained herebelow. At the front of the headlight, the socket head 51 of the adjusting tool 5 is fitted onto the second head 36 of the adjusting screw 30 as shown in FIGS. 3 and 4. As the adjusting tool 5 is turned, the screw mounting 32 is moved as screwed along the axis of the adjusting screw 30 in the direction of arrow A (toward the front of the headlight) or B (toward the back of the headlight) in FIG. 3. The lamp unit 1 is tilted horizontally about a vertical axis connecting the pivot mechanism 20 and the vertical optical axis adjuster.

At the back of the headlight, the adjusting tool 5 is engaged onto the first head 35 of the adjusting screw 30 (which is not illustrated). As the adjusting tool 5 is turned, the lamp unit i is tilted horizontally in a same manner as in the above.

Therefore, according to the present invention, the optical axis of the automotive headlight can be adjusted at either of the front and back of the headlight.

Also, even if the adjusting screw 30 is turned excessively with the adjusting tool 5 in the direction in which the screw mounting 32 is moved toward the front of the headlight (in the direction of arrow A) during adjustment of the headlight optical axis at the back of the headlight, the stopper 361 abuts the first abutment 171 to prevent the adjusting screw 30 from coming off from the screw mounting 32.

Further, when the screw mounting 32 is moved to the predetermined position toward the front of the headlight during adjustment of the optical axis at the front of the headlight, the socket head 51 of the tool 5 abuts the second abutment 172 and is disengaged from on the second screw head 36.

Figure 6:
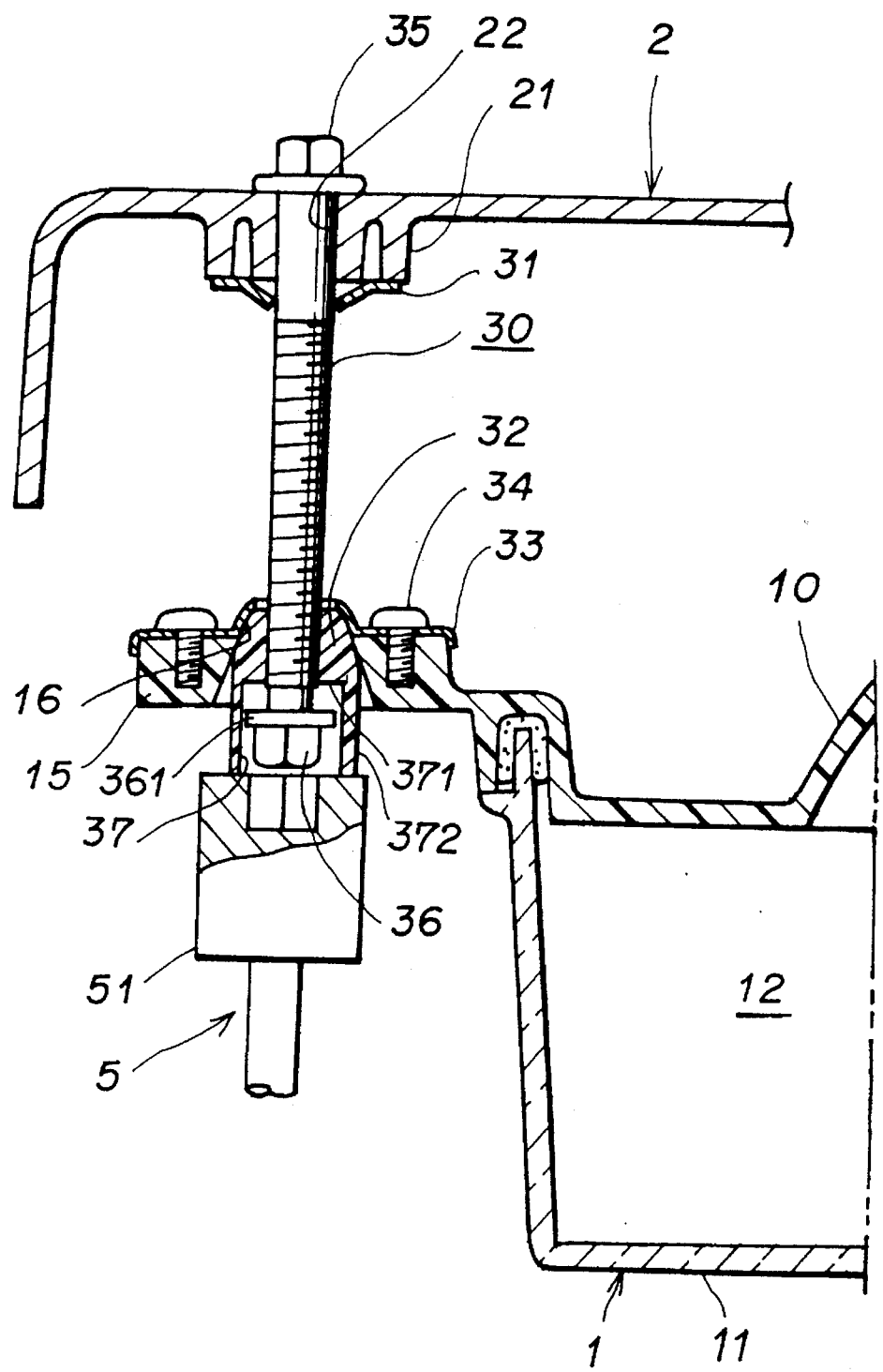
FIG. 6 is a sectional view, partially enlarged in scale, of a variant of the embodiment of the optical axis adjusting device according to the present invention, showing a disengagement of the adjusting tool from on the adjusting screw, taking place when the adjusting tool is excessively turned in the unscrewing direction of the adjusting screw.

FIG. 6 is a sectional view, partially enlarged in scale, of the variant of the aforementioned embodiment of the optical axis adjusting device for automotive headlights according to the present invention.

In this variant, the screw mounting 32 has formed on the front side thereof a concavity 37 of which the bottom serves as a first abutment 371 and the edge serves as a second abutment 372. The diameter and depth of the opening of the concavity 37 are nearly equal to those of the opening of the concavity 17 in the embodiment.

The variant shows a same action and effect as those of the embodiment having been described in the foregoing.

In the embodiment and its variant, the second abutments 172 and 372 are formed on the edges of the concavities 17 and 37, respectively. However, they may be formed on a pin protruding, or a projection, from the first abutment formed at the front of the lamp unit 1 or screw mounting 32. In this case, the length of the second abutment from the first abutment should be larger than the height of the stopper 361 and second screw head 36 of the adjusting screw 30, and the second abutment should abut the socket head 51 of the adjusting tool 5.

Since the horizontal and vertical optical axis adjusters are generally identical in construction and effect to each other, only the horizontal optical axis adjuster has been described in the foregoing.

What is claimed is:

1. In an automotive headlight with a lamp unit tiltably mounted to a car body by means of a pivot mechanism, and an optical axis adjusting device consisting of a pair of optical axis adjusters provided between said lamp unit and car body and each composed of an adjusting screw and screw mounting to adjust the optical axis of said lamp unit with said lamp unit tilted horizontally or vertically with respect to said car body by turning said adjusting screw, the improvement of said optical axis adjusting device, including:

each of said screw mountings being fixed to said lamp unit non-rotatably about the axis of each of said adjusting screws;

said adjusting screw being mounted to said car body rotatably but not axially movably as screwed in said screw mounting, one end of said adjusting screw being protruded to the back of the headlight from said car body while the other end is protruded to the front of the headlight from said screw mounting;

said adjusting screw having formed at the one end thereof a first head onto which an adjusting tool is to be fitted;

said adjusting screw having provided at the other end thereof a second head on which said adjusting tool is to be fitted;

said second screw head including a stopper which is to abut a first abutment formed on the side of said lamp unit or screw mounting and prevent said adjusting screw from coming off from said screw mounting when said adjusting screw is excessively turned at said first head thereof at the back of the headlight in a direction to move said screw mounting toward the front of the headlight; and said lamp unit or screw mounting having provided thereon a second abutment which said adjusting tool abuts and works to disengage said adjusting tool from on said second screw head when said screw mounting is moved to a predetermined position during adjustment of the optical axis at said second screw head.

2. An optical axis adjusting device as set forth in claim 1, wherein said first abutment is the bottom of a concavity formed at the front of said lamp unit while said second abutment is the edge of said concavity;

the front opening of said concavity is so large as to receive said stopper and second screw head and that the socket head of said adjusting tool abuts the second abutment; and the depth of said concavity to the bottom of said first abutment is larger than the height of said stopper and second screw head.

3. An optical axis adjusting device as set forth in claim 1, wherein said first abutment is the bottom of said concavity formed at the front of said screw mounting while said second abutment is the edge of said concavity;

the front opening of said concavity is so large as to receive said stopper and second screw head and that the head of said adjusting tool abuts the second abutment; and the depth of said concavity to the bottom of said first abutment is larger than the height of said stopper and second screw head.

\* \* \* \* \*